United States Patent [19]
Ishida et al.

[11] Patent Number: 5,572,428
[45] Date of Patent: Nov. 5, 1996

[54] ANTI-COLLISION SYSTEM FOR VEHICLES

[75] Inventors: Shinnosuke Ishida; Kenshiro Hashimoto, both of Wako, Japan

[73] Assignee: Honda Giken Kogyo Kabushiki Kaisha, Tokyo, Japan

[21] Appl. No.: 313,991

[22] Filed: Sep. 28, 1994

[30] Foreign Application Priority Data

Sep. 30, 1993 [JP] Japan .................. 5-268128

[51] Int. Cl.⁶ .................. G06F 165/00
[52] U.S. Cl. .................. 364/461; 364/426.04; 342/455; 340/903; 180/169; 180/170
[58] Field of Search .................. 364/460, 461, 364/426.04, 431.07; 180/167–170, 176–179; 342/454, 455; 340/901, 902, 903, 904

[56] References Cited

U.S. PATENT DOCUMENTS

| | | | |
|---|---|---|---|
| 4,308,536 | 12/1981 | Sims et al. | 343/7 VM |
| 5,014,200 | 5/1991 | Chundrlik et al. | 364/426.04 |
| 5,181,037 | 1/1993 | Komatsu | 342/70 |
| 5,249,128 | 9/1993 | Markandey et al. | 364/426.04 |
| 5,301,115 | 4/1994 | Nouso | 364/461 |
| 5,331,561 | 7/1994 | Barrett et al. | 364/460 |
| 5,332,057 | 7/1994 | Butsuen et al. | 364/461 |
| 5,349,533 | 9/1994 | Libby | 364/461 |
| 5,357,438 | 10/1994 | Davidian | 364/461 |
| 5,369,590 | 11/1994 | Karasudani | 364/461 |
| 5,388,048 | 2/1995 | Yavnayi et al. | 364/461 |
| 5,396,426 | 3/1995 | Hibino et al. | 364/426.04 |
| 5,416,713 | 5/1995 | Kameda et al. | 364/461 |
| 5,420,792 | 5/1995 | Butsuen et al. | 364/461 |

FOREIGN PATENT DOCUMENTS 61-84578  4/1986  Japan .

*Primary Examiner*—Gary Chin
*Attorney, Agent, or Firm*—Lyon & Lyon

[57] ABSTRACT

An anti-collision system detects conditions of an object preceding a source vehicle, and parameters indicative of operating conditions of the source vehicle, and controls the source vehicle so as to prevent a collision with the object, based on the detected conditions of the object and the detected operating conditions of the source vehicle. The system estimates a path of travel of the source vehicle, based on the detected parameters, and sets an area of travel of the source vehicle to a first predetermined area lying about the estimated path of travel. Further, the system estimates a path of movement of the object, based on the detected conditions of the object, and sets an area of movement of the object to a second predetermined area lying the estimated path of movement. The system calculates a possibility of collision, based on the set area of travel and area of movement, to thereby control the velocity of the source vehicle.

9 Claims, 19 Drawing Sheets

FIG.3

| ESTIMATED TIME PERIOD | ESTIMATED LOCATION X | ESTIMATED LOCATION Y |
|---|---|---|
| 100ms | 1000cm | 20cm |
| 200ms | 2300cm | 25cm |
| 300ms | 3500cm | 28cm |
| 400ms | 4700cm | 30cm |
| ⋮ | ⋮ | ⋮ |
| n | xxxcm | yyycm |

FIG.5

| ESTIMATED TIME PERIOD | ESTIMATED LOCATION(X,Y) | ESTIMATED LOCATION(X',Y') |
|---|---|---|
| T1 | 100 , -250 | 100 , -50 |
| T2 | 110 , -260 | 110 , -40 |
| T3 | 118 , -270 | 120 , -38 |
| T4 | 120 , -280 | 125 , -35 |
| T5 | 125 , -290 | 130 , -30 |
| T6 | 130 , -295 | 135 , -25 |
| T7 | 135 , -300 | 140 , -20 |
| ⋮ | ⋮ | ⋮ |
| Tn | 200 , 500 | 230 , 30 |

FIG.8

| ESTIMATED TIME PERIOD | ESTIMATED LOCATION X | ESTIMATED LOCATION Y |
|---|---|---|
| 100ms | 3000cm | 20cm |
| 200ms | 3300cm | 25cm |
| 300ms | 3500cm | 28cm |
| 400ms | 3700cm | 30cm |
| ⋮ | ⋮ | ⋮ |
| n | xxxcm | yyycm |

FIG.9

| ESTIMATED TIME PERIOD | ESTIMATED LOCATION (X,Y) | ESTIMATED LOCATION (X',Y') |
|---|---|---|
| T1 | 124 , -291 | 132 , -30 |
| T2 | 125 , -292 | 133 , -29 |
| T3 | 126 , -293 | 134 , -28 |
| T4 | 127 , -294 | 135 , -27 |
| T5 | 128 , -295 | 136 , -26 |
| T6 | 130 , -298 | 137 , -25 |
| T7 | 131 , -299 | 138 , -24 |
| ⋮ | ⋮ | ⋮ |
| Tn | 135 , 310 | 139 , -10 |

OBJECT TRAVEL AREA MAP 2

OBJECT TRAVEL AREA MAP 3

COLLISION PROBABILITY DEGREE AT T2

COLLISION PROBABILITY DEGREE AT T3

COLLISION PROBABILITY DEGREE AT T4

COLLISION PROBABILITY DEGREE AT T5

ANTI-COLLISION SYSTEM FOR VEHICLES

BACKGROUND OF THE INVENTION

1. Field of the Invention

This invention relates to an anti-collision system for vehicles, for preventing a collision of the vehicle with an object such as a preceding vehicle by detecting objects in the vicinity of the source vehicle.

2. Prior Art

Recently, a so-called anti-collision system for vehicles has been proposed, which detects an object present in the vicinity of the vehicle, and issues a warning of a potential collision to the driver and/or automatically controls the vehicle to decelerate when the vehicle approaches a position where a collision of the vehicle with the object can occur.

Specifically, an anti-collision system of this kind is known, for example, from Japanese Provisional Patent Publication (Kokai) No. 61-84578, which is mounted in an automotive vehicle and constructed such that when an object is detected in the vicinity of the source vehicle by a sensor thereof, an estimated path of travel of the object is calculated in response to the present traveling speed and steering-turning angle (rudder angle) of the source vehicle, and whether there is a danger of a collision of the source with the object, which will surely occur when the source vehicle continues to travel with the present vehicle speed, is determined based on the thus calculated estimated path of travel, to thereby issue an appropriate warning to the driver and/or control the operation of the vehicle, based on the determination result.

Further, an adaptive cruise system is known from U.S. Pat. No. 5,014,200, which calculates a desired trailing distance to a target vehicle, based on the speed of the source vehicle, the distance between the source vehicle and the target vehicle, and the operator reaction time, to thereby control the speed of the vehicle to maintain the distance to the target vehicle at the desired trailing distance.

Still further, an FM radar system is known from U.S. Pat. No. 4,308,536, which irradiates a target object with overlapped pulsed radiant beams, periodically determines from reflected signals from the beams the relative velocity and distance between the source vehicle and the object, and determines from the relative velocity and distance whether the vehicle and the object are on a collision course to provide a warning signal to the driver.

In the first-mentioned conventional anti-collision system, the speed and steering-turning angle of the source vehicle are used as parameters to calculate an estimated path of travel of the vehicle. However, the path of travel estimated based on the detected steering-turning angle does not always correspond to the actual path of travel, due to various factors, such as the road surface condition, peculiarities of the wheel tires used, wind, and other disturbances applied on the vehicle body. Further, according to the conventional system, the path of travel is calculated in terms of a line of travel, whereas the vehicle has a substantial width, which makes it difficult to determine the possibility of collision of the vehicle with an object, from the estimated path of travel in terms of a line of travel. Therefore, to carry out accurate determination of a potential collision of the source vehicle with an object, it is required to estimate the path of travel of the source vehicle in terms of an area of travel.

This requirement is not contemplated by the other above-mentioned conventional systems, either.

SUMMARY OF THE INVENTION

It is the object of the invention to provide an anti-collision system for vehicles, which is capable of performing accurate determination of a potential collision of the vehicle with an object.

To attain the above object, the present invention provides an anti-collision system for preventing a collision of a source vehicle with an object, including object-detecting means for detecting conditions of the object present in the vicinity of the source vehicle, the object including a traveling vehicle preceding the source vehicle, operating condition-detecting means for detecting parameters indicative of operating conditions of the source vehicle, and control means for controlling the source vehicle so as to prevent a collision thereof with the object, based on the conditions of the object detected by the object-detecting means, and the parameters detected by the operating condition-detecting means.

The anti-collision system according to the invention is characterized by comprising:

first estimating means for estimating a path of travel of the source vehicle, based on the parameters detected by the operating condition-detecting means;

first setting means for setting an area of travel of the source vehicle to a first predetermined area lying about the path of travel of the source vehicle estimated by the first estimating means;

second estimating means for estimating a path of movement of the object, based on the conditions of the object detected by the object-detecting means;

second setting means for setting an area of movement of the object to a second predetermined area lying about the path of movement of the object estimated by the second estimating means; and calculating means for calculating a possibility of collision between the source vehicle and the object, based on the area of travel of the source vehicle set by the first setting means, and the area of movement of the object set by the second setting means; and wherein the control means is responsive to the possibility of collision calculated by the calculating means, for controlling velocity of the source vehicle.

Preferably, the first setting means sets the area of travel of the source vehicle having a predetermined width set on either side of the estimated path of travel of the source vehicle transversely of an advancing direction of the estimated path of travel, and the second setting means sets the area of movement of the object having a predetermined width set on either side of the estimated path of movement of the object transversely of an advancing direction of the estimated path of movement.

Alternatively, the first setting means sets the area of travel of the source vehicle having a variable width determined based on a travel distance over which the source vehicle travels from a starting point of the estimated path of travel thereof and set on either side of the estimated path of travel transversely of an advancing direction of the estimated path of travel, and the second setting means sets the area of movement of the object having a variable width determined based on a movement distance over which the object moves from a starting point of the estimated path of movement thereof and set on either side of the estimated path of movement transversely of an advancing direction of the estimated path of movement.

Further preferably, the first setting means sets the area of travel of the source vehicle having a variable width determined based on a travel distance over which the source vehicle travels from a starting point of the estimated path of travel thereof and set on either side of the estimated path transversely of an advancing direction of the estimated path of travel, and a size of at least one of the source vehicle and the object, and the second setting means sets the area of movement of the object having a variable width determined based on a movement distance over which the object moves from a starting point of the estimated path of movement thereof and set on either side of the estimated path of movement transversely of an advancing direction of the estimated path of movement, and a size of at least one of the source vehicle and the object.

Preferably, the operating condition-detecting means detects a yaw rate of the source vehicle as one of the parameters indicative of the operating conditions of the source vehicle.

Also preferably, the calculating means detects relative velocity between the source vehicle and the object and a relative distance therebetween, in dependence on the possibility of collision calculated, and calculates a desired deceleration value of the source vehicle and a desired value of velocity of the source vehicle to which the source vehicle is to decelerate, based on the detected relative velocity and relative distance, the control means controlling the velocity of the source vehicle, based on the calculated desired deceleration value and desired value of velocity.

Advantageously, the anti-collision system includes warning means for issuing a warning to a driver of the source vehicle when the control means controls the velocity of the source vehicle.

Preferably, the first setting means sets the area of travel of the source vehicle by the use of a probability density function indicative of a probability of existence of the source vehicle in the area of travel of the source vehicle.

Further preferably, the first setting means sets the area of travel of the source vehicle by the use of a probability density function indicative of a probability of existence of the source vehicle in the area of travel of the source vehicle, and the second setting means sets the area of movement of the object by the use of a second probability density function indicative of a probability of existence of the object in the area of movement of the object.

The above and other objects, features, and advantages of the invention will be more apparent from the following detailed description taken in conjunction with the accompanying drawings.

BRIEF DESCRIPTION OF THE DRAWINGS

FIG. 3 shows, by way of example, parameter values forming an estimated path of travel of a source vehicle;

FIG. 5 shows, by way of example, a map of an estimated area of travel of a source vehicle;

FIG. 8 shows, by way of example, parameter values forming an estimated path of travel of an object, which should be obtained if the object travels over a time period of Tn sec;

FIG. 9 shows, by way of example, a map of an estimated area of travel of the object, which is determined from the path of travel of FIG. 8 by the manner of FIG. 7;

FIGS. 19A to 19D are graphs showing degrees of collision probability at successive time points; wherein:

FIG. 19A shows a collision probability degree at a time point T2;

FIG. 19B shows a collision probability degree at a time point T3;

FIG. 19C shows a collision probability degree at a time point T4; and

FIG. 19D shows a collision probability degree at a time point T5;

DETAILED DESCRIPTION

The invention will now be described in detail with reference to the drawings showing embodiments thereof.

Figure 1:
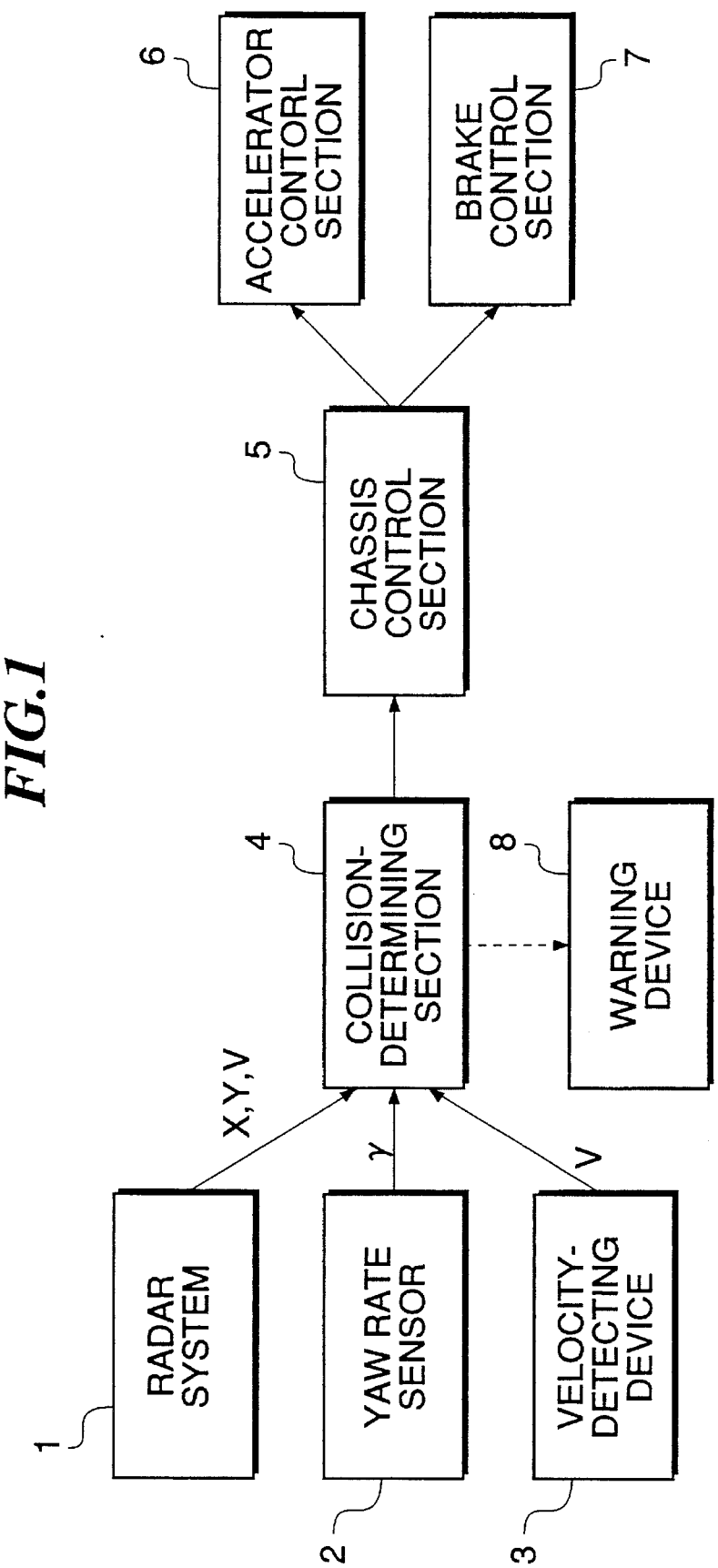
FIG. 1 is a block diagram schematically showing the whole arrangement of an anti-collision system according to a first embodiment of the invention.

Referring first to FIG. 1, there is schematically illustrated the whole arrangement of an anti-collision system according to the invention.

In the figure, reference numeral 1 designates a radar system as a sensor which detects the location and traveling velocity of an object, not shown, such as a traveling vehicle preceding the source vehicle. An output of the radar system 1 is connected to an input of a collision-determining section 4. Similarly, an output of a yaw rate sensor 2 for detecting a yaw rate of the source vehicle and an output of a velocity-detecting device 3 for detecting the velocity (speed) of the source vehicle are connected to the input of the collision-determining section 4. The collision-determining section 4 calculates a desired value of deceleration and a desired value of velocity of the source vehicle to which the vehicle is to be decelerated (hereinafter referred to as "decelerating velocity"), based on output values of the radar system 1, the yaw rate sensor 2, and the velocity-detecting device 3. An output of the collision-determining section 4 is connected to an input of a chassis control section 5 which generates a control signal for controlling the velocity of the source vehicle in response to the thus calculated desired deceleration value and desired decelerating velocity value. Further, an output of the chassis control section 5 is connected to an input of an accelerator control section 6 for controlling an accelerator of the source vehicle in response to the control signal from the chassis control section 5, as well as to an input of a brake control section 7 for controlling a brake of the source vehicle. The output of the collision-determining section 4 may be also connected to a warning device 8 which issues a warning to alert the driver, in response to an output from the collision-determining section 4.

Figure 2:
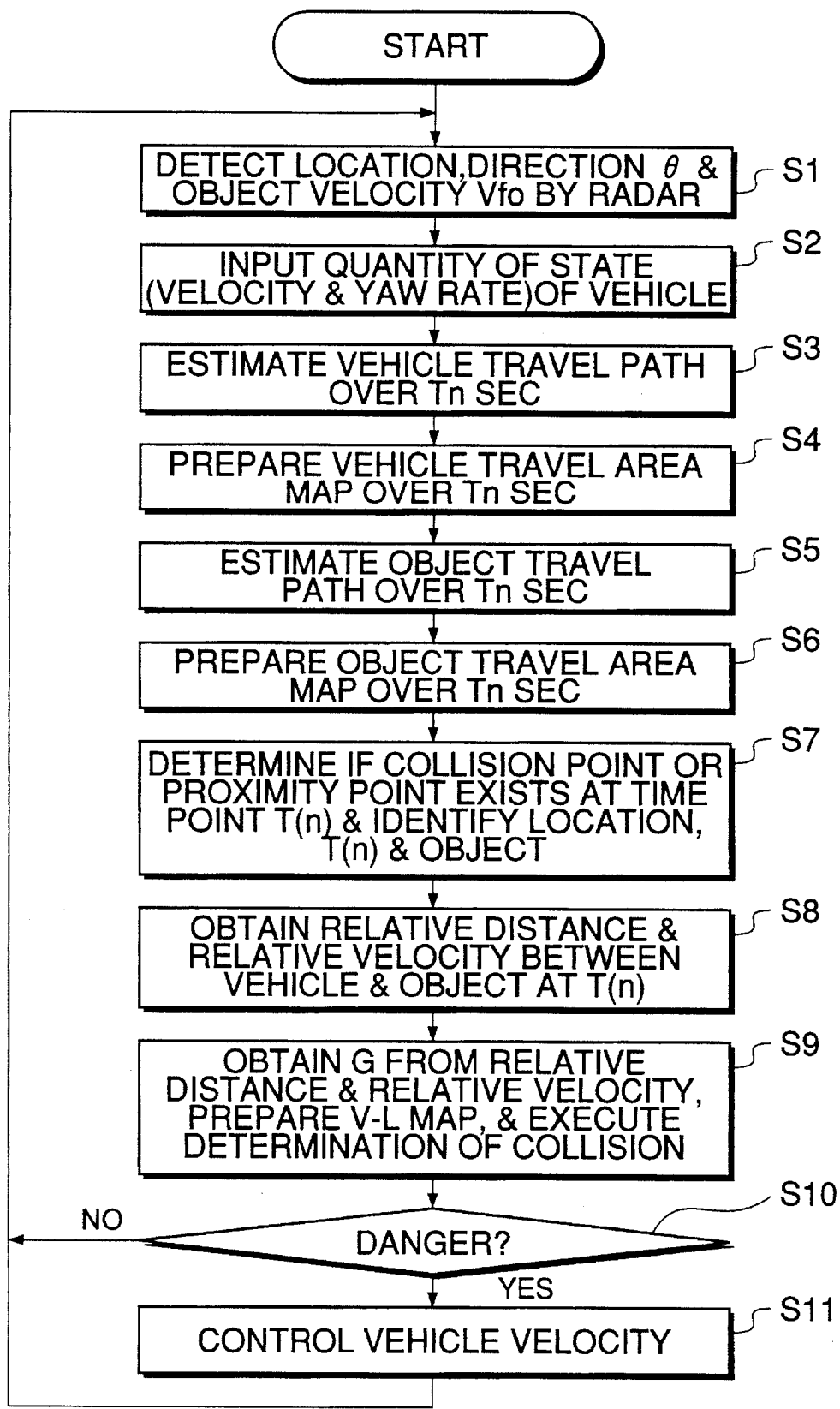
FIG. 2 is a flowchart showing a program for executing collision-prevention control, according to the first embodiment.

FIG. 2 shows a program for executing collision-prevention control, which is carried out by the anti-collision system shown in FIG. 1.

First, at a step S1, a location $(Xf_0, Yf0_0)$, a direction $\Theta$, a velocity $Vf_0$ of an object in front of the source vehicle are detected by the radar system 1 according to a known technique, for example, such as a laser radar or a millimeter wave radar, and the detected parameter values are stored into a memory, not shown. In this embodiment, a millimeter wave radar of an FM multi-beam type is employed, as proposed by U.S. Pat. No. 5,181,037 assigned to the present assignee, which can detect the distance, direction, and relative velocity of an object. At a step S2, a quantity of state, i.e. a yaw rate $\gamma$ and a vehicle velocity $V_0$ of the source vehicle are detected by the yaw rate sensor 2 and the velocity-detecting device 3, and the detected parameter values are stored into the memory.

At the following step S3, a path of travel of the source vehicle which should be obtained if the source vehicle travels over a predetermined time period Tn sec is estimated by the collision-determining section 4, based on the vehicle velocity $V_0$ and the yaw rate $\gamma$ of the source vehicle. $\underline{n}$ of the time period Tn represents an integer larger than 0, the upper limit thereof being set to a sufficiently large value, based on the processing speed of the whole system and the velocity of the source vehicle, etc.

Figure 4:
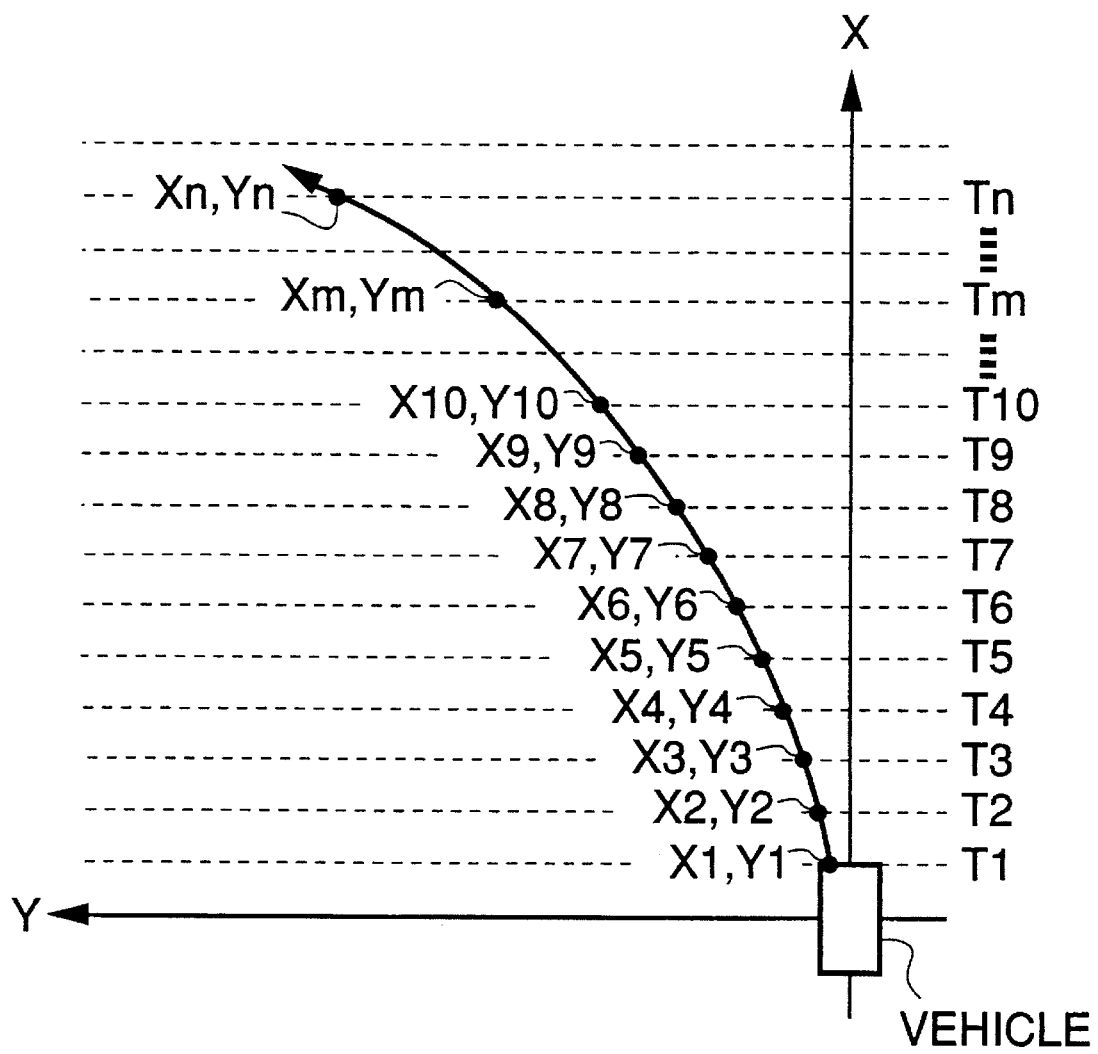
FIG. 4 is a graph showing the estimated path of travel of FIG. 3, plotted on the X-Y plane.

FIG. 3 shows parameter values forming an estimated path of travel of the source vehicle, by way of example. As shown in the figure, an estimated location X in the X-axis direction (advancing direction of the vehicle) and an estimated location Y in the Y-axis direction (direction orthogonal to the advancing direction), to which the vehicle is to move, are calculated every 100 msec, based on present values of the vehicle velocity $V_0$ and the yaw rate $\gamma$ of the source vehicle. The thus calculated locations are stored into the memory. FIG. 4 shows the estimated path of travel of the source vehicle depicted in the form of a curved line plotted on the X-Y plane. In the figure, (Xn, Yn) represents a location of the source vehicle at a time point T(n) ($\underline{n}$=0, 1, ... ). To simplify the description, provided that the time interval of calculating the estimated location of the source vehicle is set to a predetermined fixed value $\Delta t$, the time period Tn is expressed by the following equation (1):

$$Tn = \Delta t \times \underline{n} \quad (1)$$

The location (Xn, Yn) of the source vehicle at the time point T(n) can be determined based on the thus obtained Tn value, the vehicle velocity $V_0$ and the yaw angle $\gamma$, by the use of the following equations (2) and (3):

$$Xn = V_0 \times Tn \quad (2)$$

$$Yn = (Xn^2/2V_0) \times \gamma \quad (3)$$

The estimated path of travel formed by the parameter values of FIG. 3 is formed by locations determined by the location (Xn, Yn) of the source vehicle and the time point T(n) determined by the use of the equations (1), (2) and (3), wherein the above time interval $\Delta t$ is set to 100 msec.

Referring again to the flowchart of FIG. 2, at a step S4, a map for estimating an area of travel of the source vehicle which should be obtained if the source vehicle travels over the time period Tn sec is prepared.

Figure 6:
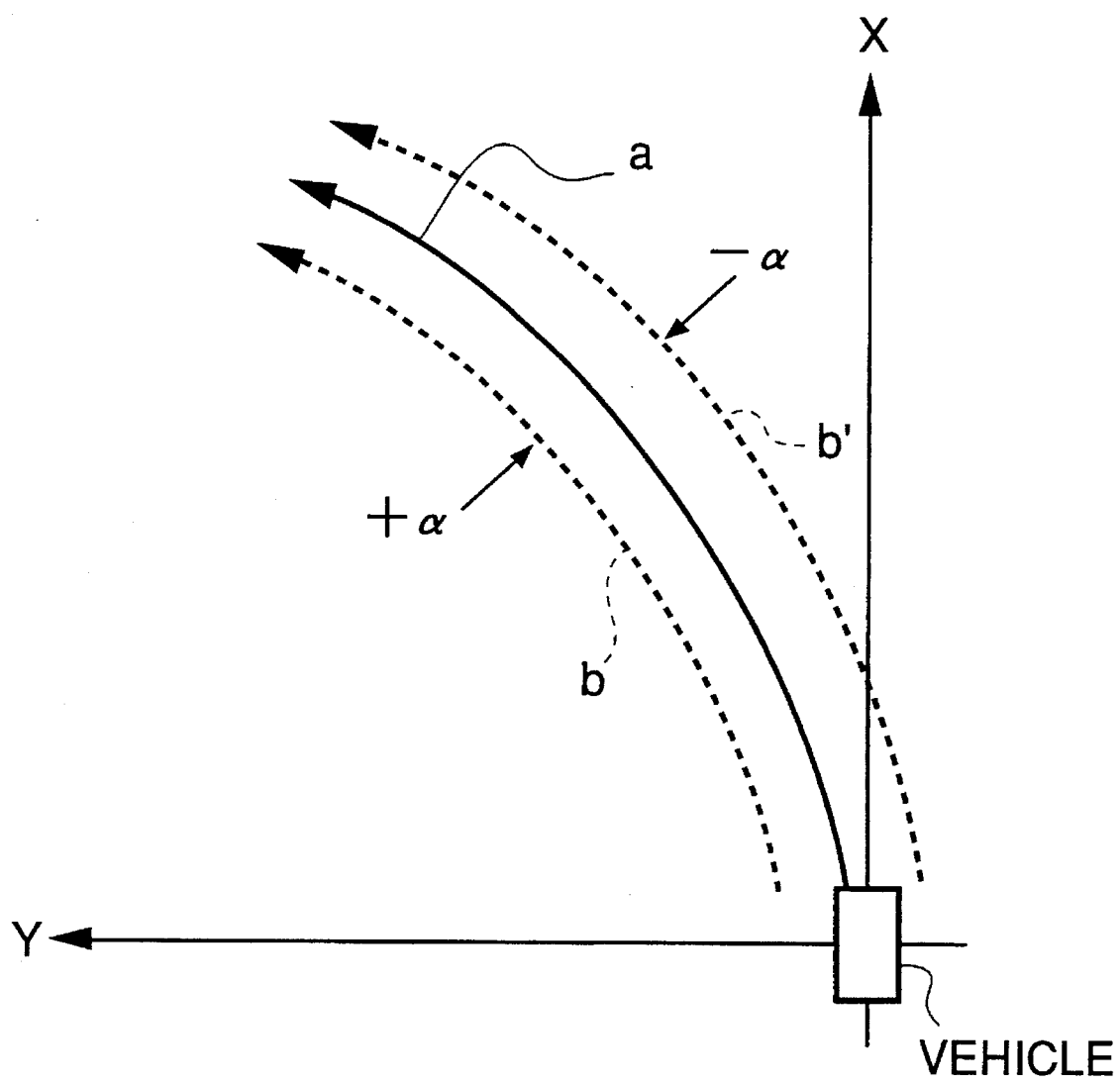
FIG. 6 is a graph showing the estimated area of travel of FIG. 5, plotted on the X-Y plane.
Figure 7:
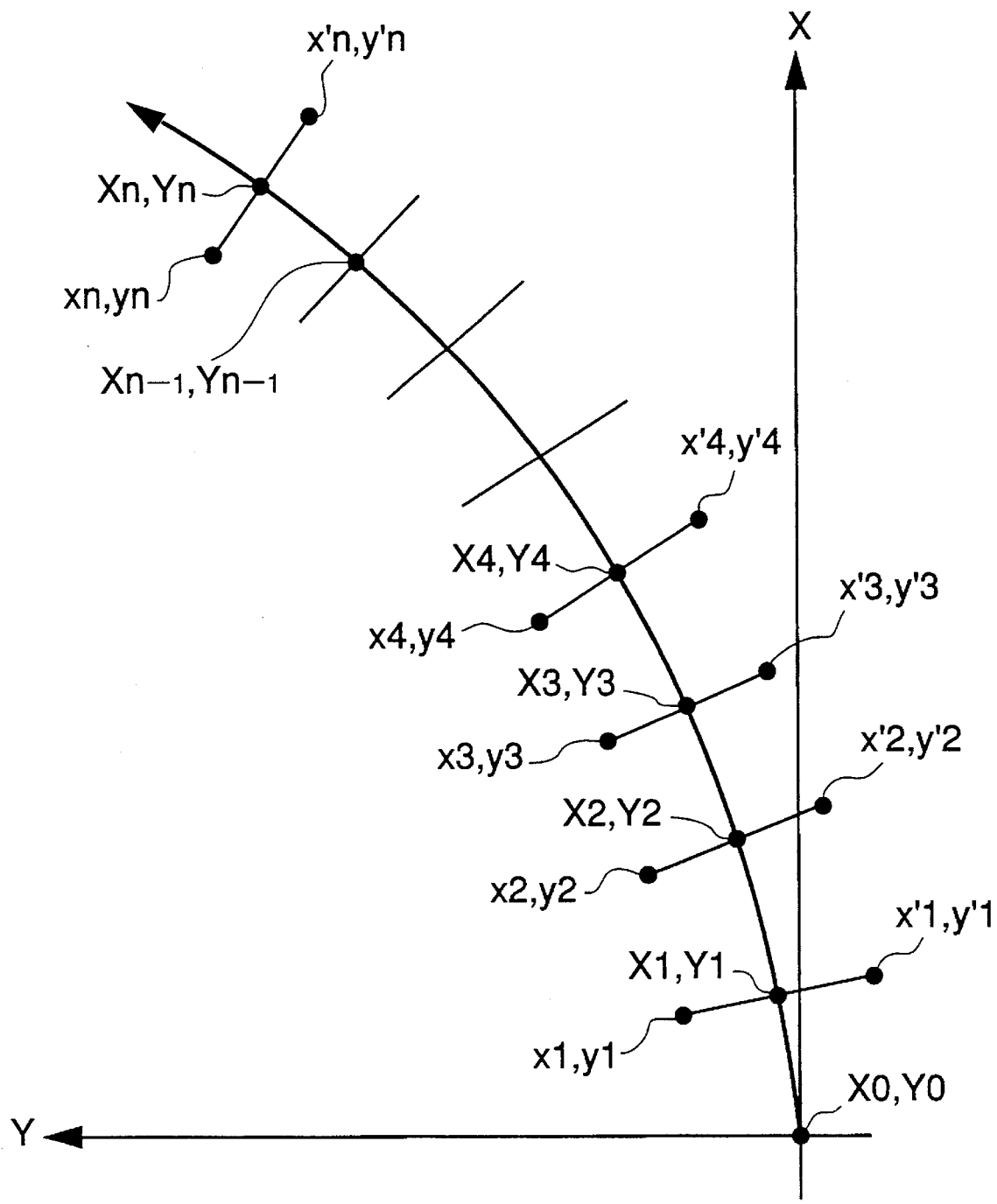
FIG. 7 is a graph useful in explaining a manner of determining the area of travel of the source vehicle.

FIG. 5 shows an example of the map of the estimated area of travel of the source vehicle. Parameter values shown in FIG. 5 form an area having a predetermined width in contrast with the path of travel of FIG. 3 which is in the form of a curved line. That is, estimated locations (X, Y) and (X',Y') represent lateral side points (hereinafter refereed to as "boundary points") of the estimated area of travel of the source vehicle. FIG. 6 shows the estimated area of travel of FIG. 5, plotted on the X-Y plane. In the figure, the solid line curve a shows the estimated path of travel of the source vehicle, and the broken line curves b and b' show opposite lateral sides of the estimated area of travel. The opposite lateral sides indicated by the curves b and b' are spaced from the estimated path of travel by predetermined distances $\pm\alpha$. The predetermined distance $\alpha$ should be set to a value depending on the actual width of the road surface, preferably about 2 m if the road width is 4 m. The estimated area of travel of the source vehicle is determined based on the estimated path of travel obtained by the graph of FIG. 4, in a manner described hereinbelow: Referring to FIG. 7 which shows how the area of travel of the source vehicle is determined, a point (Xn, Yn) indicates a location of the source vehicle at a time point T(n), and points (xn, yn) and (x'n, y'n) indicate boundary points of the estimated area of travel at the time point T(n). A segment connecting between the point (xn, yn) and the point (x'n, y'n) is orthogonal to a segment connecting between the point (Xn, Yn) and a point (Xn-1, Yn-1), and the points (xn, yn) and (x'n, y'n) are at the predetermined distance $\alpha$ from the point (Xn, Yn) at left and right sides thereof. The values xn and x'n, and yn and y'n are determined by the use of the following equations (4) and (5), on condition that the segment connecting between the points (Xn, Yn) and (Xn-1, Yn-1) is orthogonal to the segment connecting between the points (xn, yn) and (x'n, y'n), and the distance between the points (Xn, Yn) and (xn, yn) and the distance between the points (Xn, Yn) and (x'n, y'n) are both equal to the predetermined value $\alpha$:

$$xn, x'n = Xn \pm \frac{\alpha|Yn-1-Yn|}{\sqrt{(Xn-1-Xn)^2+(Yn-1-Yn)^2}} \quad (4)$$

$$yn, y'n = Yn \mp \frac{\alpha|Yn-1-Yn|(Xn-1-Xn)}{(Yn-1-Yn)\sqrt{(Xn-1-Xn)^2+(Yn-1-Yn)^2}} \quad (5)$$

Values of points (xn, yn) and (x'n, y'n) thus obtained are sequentially plotted, with points where n = 0 as starting points, to thereby obtain lateral side lines defining the estimated area of travel of the source vehicle, as shown in FIG. 6.

Referring again to the flowchart of FIG. 2, at a step S5, a path of travel of the object, which is to be obtained if the object travels over the time period Tn sec, is estimated. FIG. 8 shows parameter values forming an estimated path of travel of the object to be obtained if the object travels over the time period Tn sec, by way of example. In the figure, each estimated location of the object at each time point is determined in the same manner as the estimated path of travel of the source vehicle at the step S3, based on the location $(Xf_0, Yf_0)$, the advancing direction $\Theta$, and the velocity $Vf_0$ of the object, which have been detected at the step S1 in FIG. 2.

At the following step S6, a map is prepared for estimating an area of travel of the object to be obtained if the object travels over the time period Tn sec. FIG. 9 shows an example of the map of estimated area of travel of the object. This map is prepared in the same manner as described in FIG. 7, based on the estimated path of travel of the object of FIG. 8.

Figure 10:
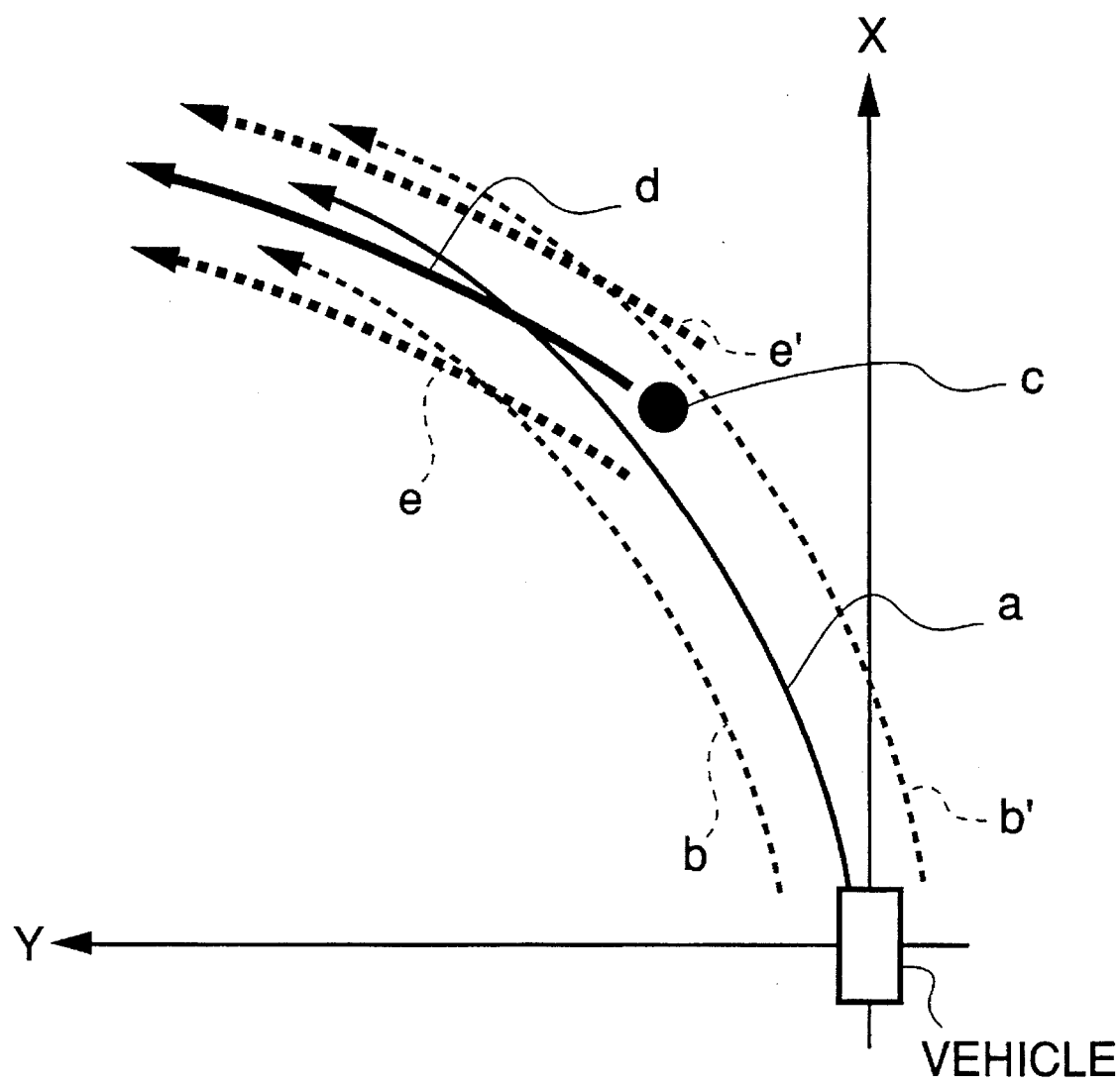
FIG. 10 is a graph showing an estimated area of travel of the object obtained from the map of FIG. 9 superposed on the estimated area of travel of the source vehicle of FIG. 6.

FIG. 10 graphically represents an estimated area of travel of the object obtained from the map of FIG. 9 superposed on the estimated area of travel of the source vehicle of FIG. 6. The figure is a composite representation of the estimated paths of travel and estimated areas of travel of the source vehicle and the object in FIGS. 3, 5, 8 and 9, wherein the black dot c represents the object. The estimated area of travel of the object has its opposite lateral sides indicated by the curves e and e' located at the predetermined distance $\alpha$ from the estimated path of travel of the object indicated by the curve d, similarly to the opposite lateral sides (curves b and b') defining the estimated area of travel of the source vehicle.

At a step S7, it is determined whether or not there exists a point at which the source vehicle and the object will coincide (hereinafter referred to as "the collision point") or closely approach each other (hereinafter referred to as "the proximity point"). If the point exits, the location and the time point corresponding to the collision point or proximity point, as well as the object are identified based on the maps of the estimated areas of travel of the source vehicle and the object. More specifically, a comparison between the boundary points (xn, yn) of the source vehicle and the object and a comparison between the boundary points (x'n, y'n) of the same are made respectively, at each time point Tn (n=1, . . . ), to thereby determine whether or not the collision point or proximity point exists. If the collision point or proximity point exists, the time point corresponding thereto is set as $T(n)_1$. For example, in the examples of FIGS. 5 and 9, at time points $T_6$ and $T_7$ the estimated area of travel of the object overlaps with the estimated area of travel of the source vehicle, and therefore it is determined that the source vehicle and the object will closely approach each other or collide with each other at the time point $T(n)_1=T_6$.

At the following step S8, the relative distance and relative velocity between the source vehicle and the object at the time point $T(n)_1$ obtained at the step S7 are determined. More specifically, the relative distance at the time point $T(n)_1$ is determined from the estimated paths of travel of the source vehicle and the object, and the relative velocity $(Vf_0-V_0)$ is determined from the velocity $V_0$ of the source vehicle and the velocity $Vf_0$ of the object. Further, at a step S9, a desired value of deceleration G is calculated based on the relative distance and the relative velocity $(Vf_0-V_0)$ obtained at the step S8, to thereby determine the possibility of a collision. At the same time, a V-L map of desired velocity V and desired distance L is prepared and displayed by a display, not shown, mounted in an instrument panel or the like in the vehicle compartment. Details of the manner of calculations at the steps S8 and S9 will be described hereinbelow:

First, the desired deceleration value G is calculated by the use of the following equation (6):

$$G=(Vf_0-V_0)/(T(n)_1-Ts) \quad (6)$$

where Ts represents a margin time period. The Ts value is empirically determined so as to fall within a range of 0.5 to 1.0 sec. The purpose of determining the desired deceleration value G is to prevent the source vehicle from colliding with the object by controlling the velocity thereof finally to the velocity of the object. By controlling the velocity of the source vehicle according to the deceleration value G calculated by the use of the equation (6), the source vehicle can be decelerated to a value equal to the velocity of the object, with the margin time period Ts remaining to elapse. In other words, after the deceleration control, the source vehicle can travel at a safety distance from the object, which corresponds to the margin time period Ts.

Figure 11:
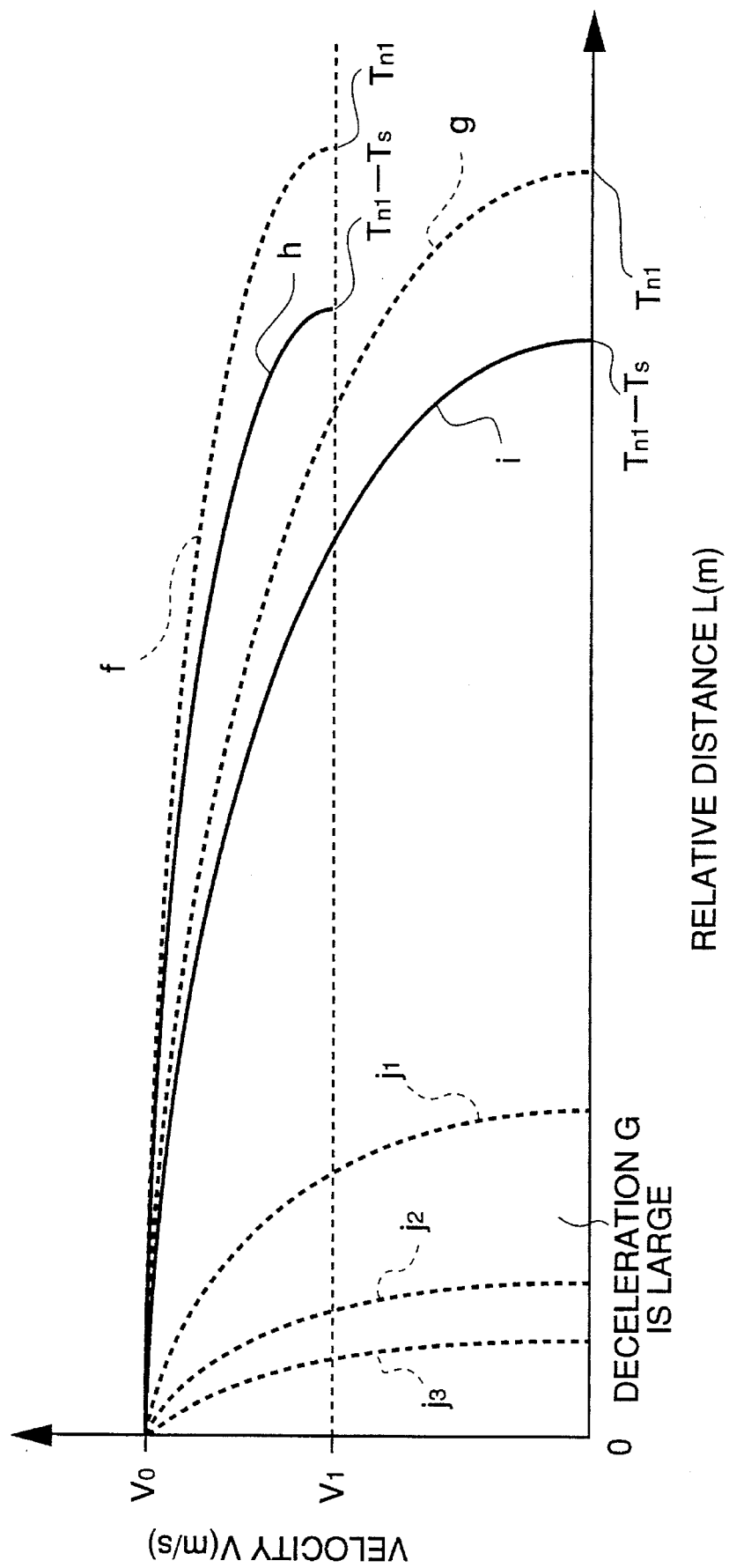
FIG. 11 shows, by way of example, a V-L table for determining a desired velocity V and a desired distance L.

FIG. 11 graphically represents the V-L map in the form of a table of desired velocity V and desired distance L, by way of example, wherein the ordinate represents the velocity V(m/s) and the abscissa the relative distance L(m).

In the figure, the broken line curve f represents a V-L track traced by the source vehicle with its velocity being reduced to a value $V_1$ at the collision point or proximity point (at the time point $T(n)_1$) provided that the object velocity $Vf_0$ is equal to $V_1$, and the broken line curve g represents a V-L track traced by the source vehicle with its velocity being reduced to 0 at the collision point or proximity point ( at the time point of $T(n)_1$ ) provided that the object velocity $Vf_0$ is equal to 0. Further, the solid line curves h and i represent V-L tracks traced by the source vehicle when it is decelerated according to the deceleration value G and then travels at the safety distance corresponding to the margin time period Ts from the object. The track indicated by the curve h is traced when the object velocity $Vf_0$ is equal to $V_1$, and the track indicated by the curve i when the object velocity $Vf_0$ is equal to 0. The other broken line curves $j_1, j_2,$ and $j_3$ represent V-L tracks traced by the source vehicle when deceleration values which are larger than the deceleration value G (curve i) are applied to the source vehicle.

Next, the manner of determining the V-L track will be described hereinbelow: As stated before, the time point $T(n)_1$ is determined from the estimated area-of-travel maps (FIGS. 5 and 9) of the source vehicle and the object. The object velocity $Vf_0$ and the source vehicle velocity $V_0$ have been detected at the respective steps S1 and S2. Therefore, the deceleration value G can be calculated from the above equation (6), only by substituting a desired Ts value for the margin time period Ts. For example, in the case of the curve g the object velocity $Vf_0$ and the margin time period Ts are both 0. By substituting these values into the equation (6), the deceleration value G can be obtained. Then, the obtained deceleration value G is substituted into the following equation (7), to obtain the curve i (track lm; m=0, 1, . . . ):

$$lm=(vm^2-V_0^2)/2G \quad (7)$$

wherein vm represents a present value of the velocity of the corresponding track.

Similarly, the curve $j_1$ can be obtained by setting the object velocity $Vf_0$ to 0, and the margin time period Ts to a value larger than the margin time period Ts for the curve i, by the use of the equations (6) and (7).

Referring again to the flowchart of FIG. 2, at a step S10, it is determined whether or not there exists a danger that the source vehicle will collide with the object, according to the deceleration value G determined by the equation (6). Specifically, the deceleration value G is always calculated to a value enabling to keep the source vehicle at the safety distance from the object. When the deceleration value G exceeds a threshold value, it is determined that a danger of a collision exists. The threshold value is a variable value set in response to the friction coefficient of the road surface, etc. Typically, the threshold value is set to 0.6 G (G: acceleration of gravity), and preferably approximately 0.4 G.

If it is determined at the step S10 that a danger of a collision exists, the program proceeds to a step S11, wherein the source vehicle has its velocity controlled based on the deceleration value G and the velocity vm of the source vehicle calculated by the aforesaid equation (6) and an equation (8), hereinafter referred to, respectively. Specifically, in FIG. 1, the chassis control section 5 calculates a braking amount to be applied to the source vehicle from the velocity vm and the deceleration value G output from the collision-determining section 4, and delivers a control signal indicative of the thus calculated braking amount to the brake control section 7, which in turn applies the braking amount to the source vehicle in response to the control signal, to thereby control the velocity of the source vehicle.

Figure 12:
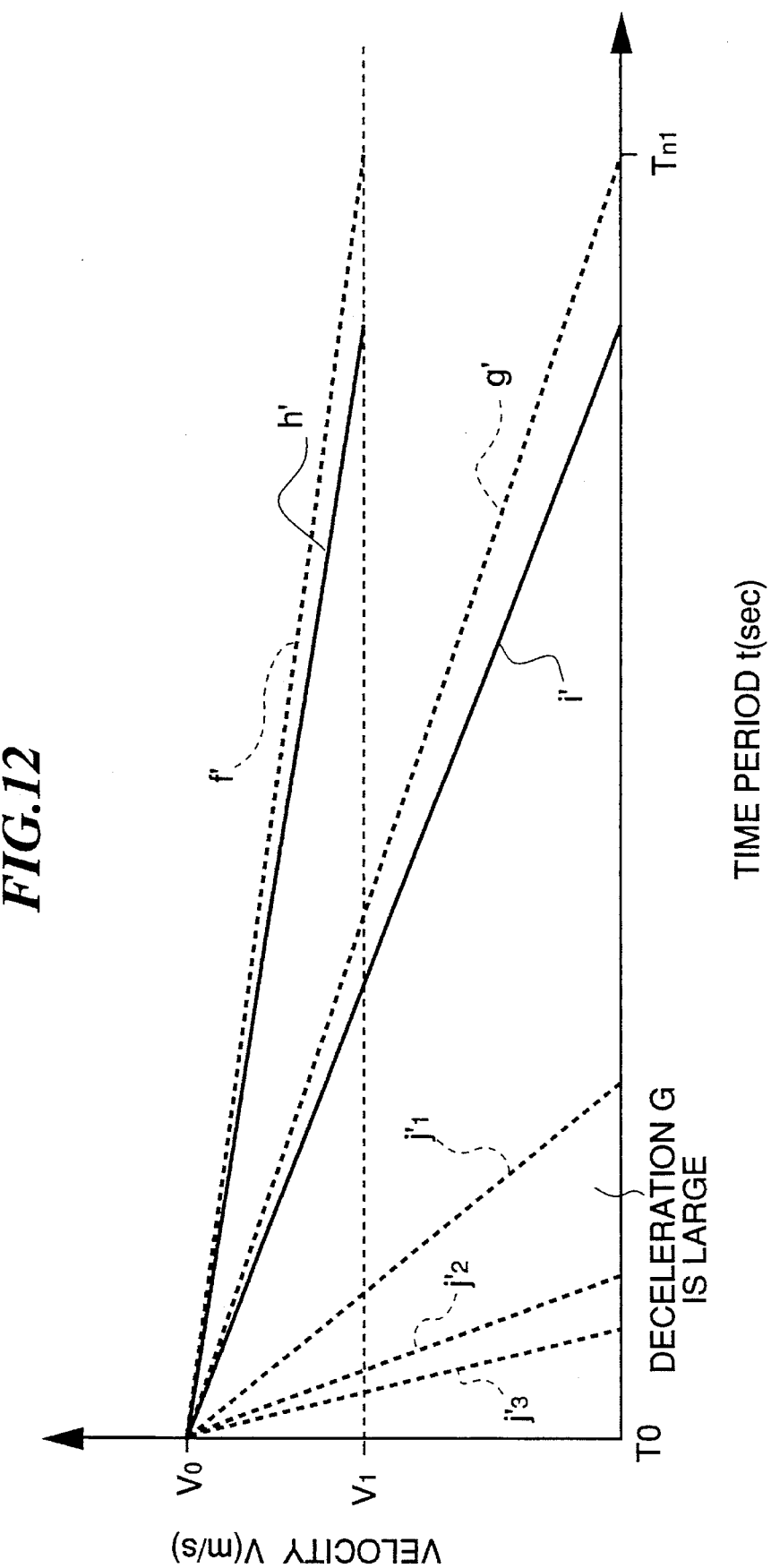
FIG. 12 shows, by way of example, a V-T table for determining the desired velocity V with respect to time T.

FIG. 12 graphically represents a V-T map in the form of a table, by way of example, showing tracks f'-h', j'1-j'3 obtained from the individual tracks in the V-L map of FIG. 11, with respect to time t (sec). Each of the tracks, i.e. velocity vm (m=0, 1, ... ) in the V-L map is determined from the deceleration value G which has been obtained by the equation (6), by the use of the following equation (8):

$$vm = V_0 - G(tm - t_0) \qquad (8)$$

where tm represents the present time.

A warning may be issued from the warning device 8 to alert the driver, in place of or together with the velocity control carried out at the step S11.

Next, a second embodiment of the invention will be described.

Figure 13:
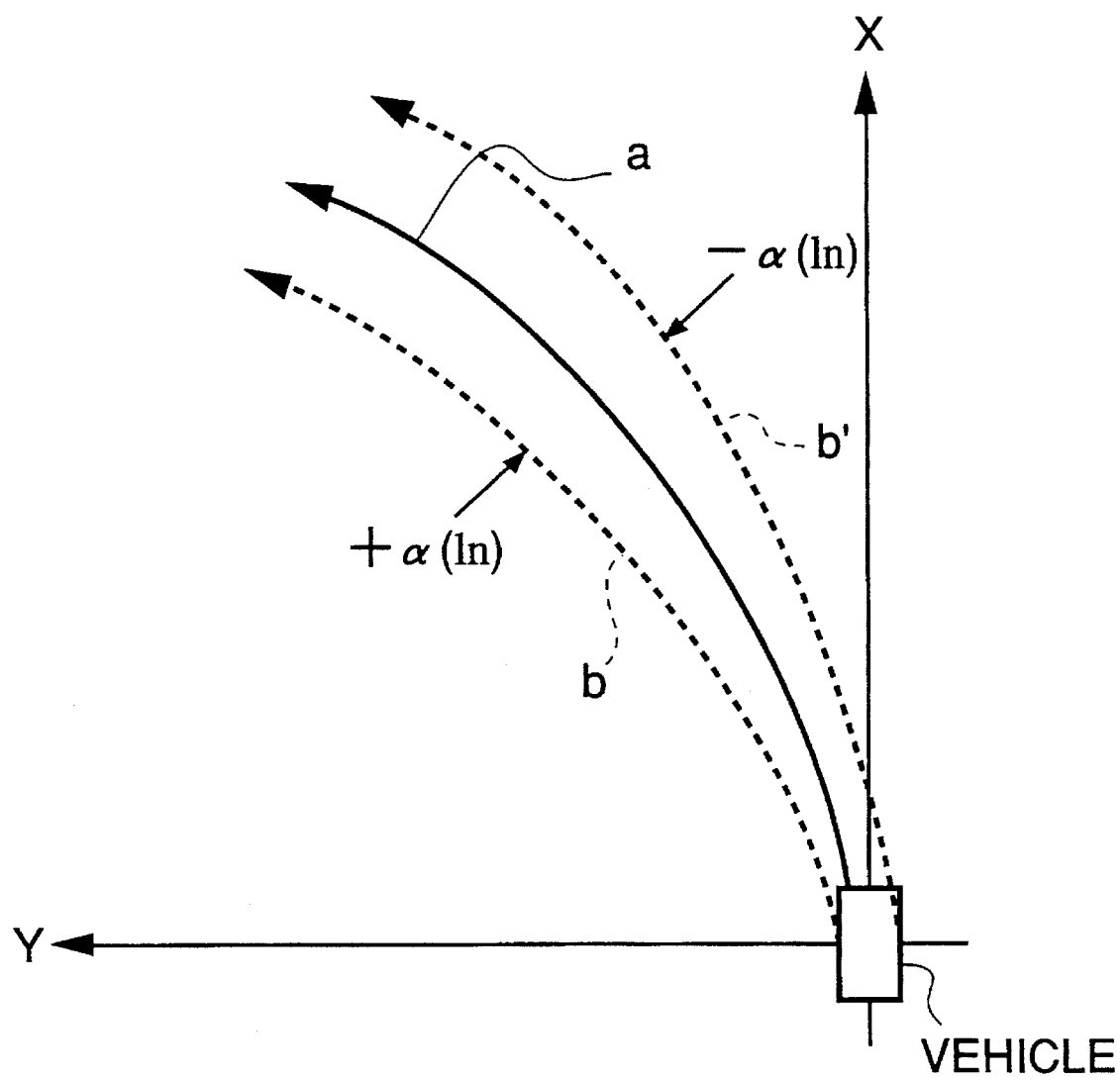
FIG. 13 is a graph showing an estimated area of travel of the source vehicle, according to a second embodiment of the invention.
Figure 14:
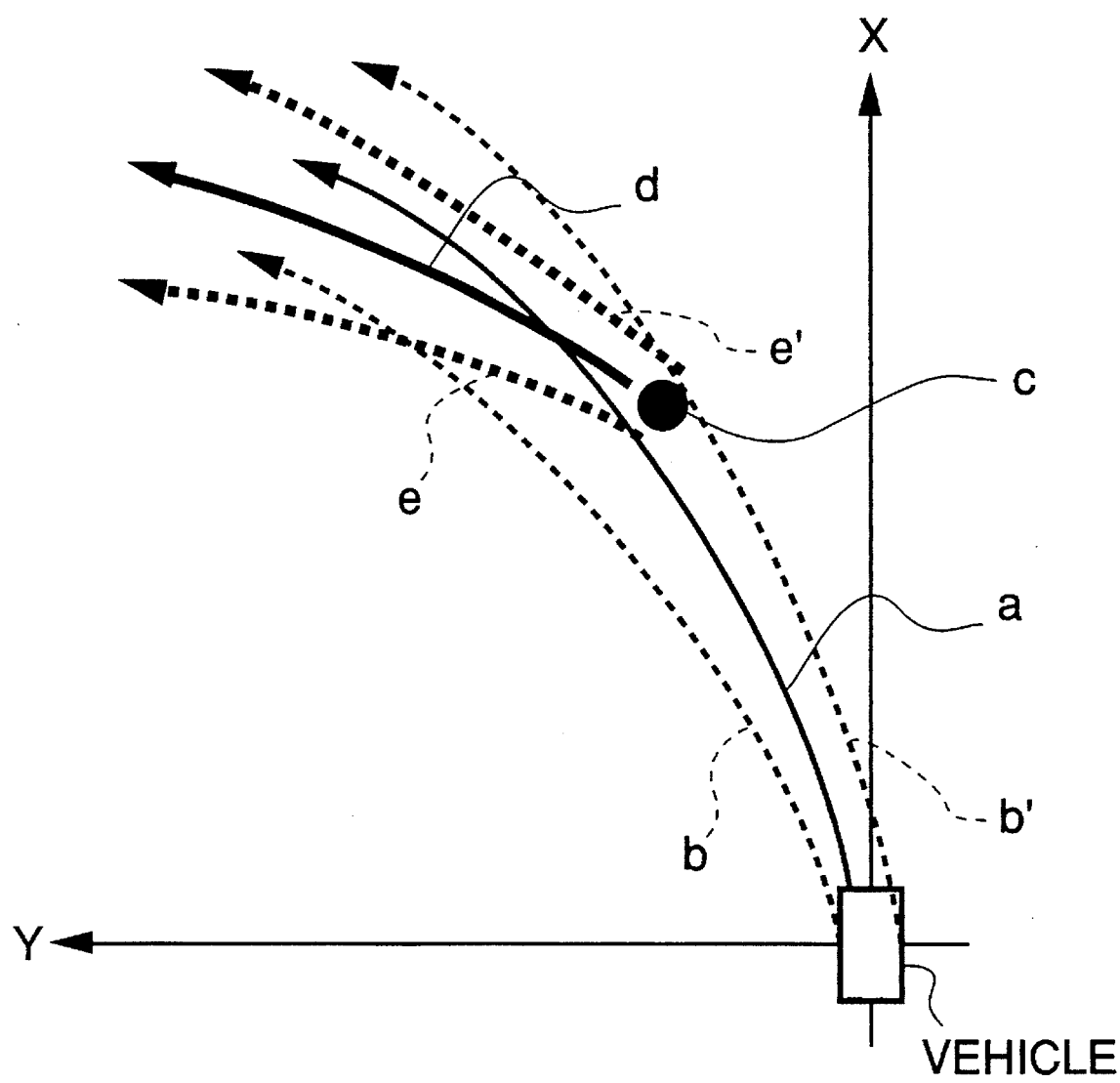
FIG. 14 is a graph showing an estimated area of travel of an object superposed on the estimated area of travel of the source vehicle of FIG. 13, according to the second embodiment.

FIG. 13 shows an estimated area of travel of the source vehicle according to the second embodiment, and FIG. 14 shows an estimated area of travel of the object superposed on the estimated area of travel of the source vehicle of FIG. 13.

In the first embodiment described hereinabove, the estimated areas of travel of the source vehicle and the object each have a width determined by the predetermined fixed distance $\alpha$ on both sides of the estimated path of travel. In the present embodiment, however, the $\alpha$ value is set to larger values as the travel distances of the vehicle and the object become longer. More specifically, according to the present embodiment, to determine boundary points (xn, yn) and (x'n, y'n), a variable distance value $\alpha$ (ln) is employed instead of the fixed distance value $\alpha$ employed in the first embodiment. $\alpha$(ln) is a function of the travel distance ln of the source vehicle or the object with respect to the starting point of the estimated path of travel. The variable distance value $\alpha$ (ln) is substituted for the fixed distance value $\alpha$ in the aforesaid equations (4) and (5) to determine the boundary points (xn, yn) and (xn', yn') and hence obtain the estimated areas of travel of the source vehicle and the object. The other parameters, i.e. the velocity and deceleration value G, possibility of a collision, etc. are determined in manners identical with those employed in the first embodiment, description thereof being omitted.

As described above, according to the present embodiment, the areas of travel of the source vehicle and the object are determined so as to broaden in width as the travel distances thereof become longer. Therefore, a criterion for determining the collision point or proximity point between the source vehicle and the object is made more strict than that in the first embodiment, to enhance the safety of the source vehicle.

Next, a third embodiment of the present invention will be described.

Figure 15:
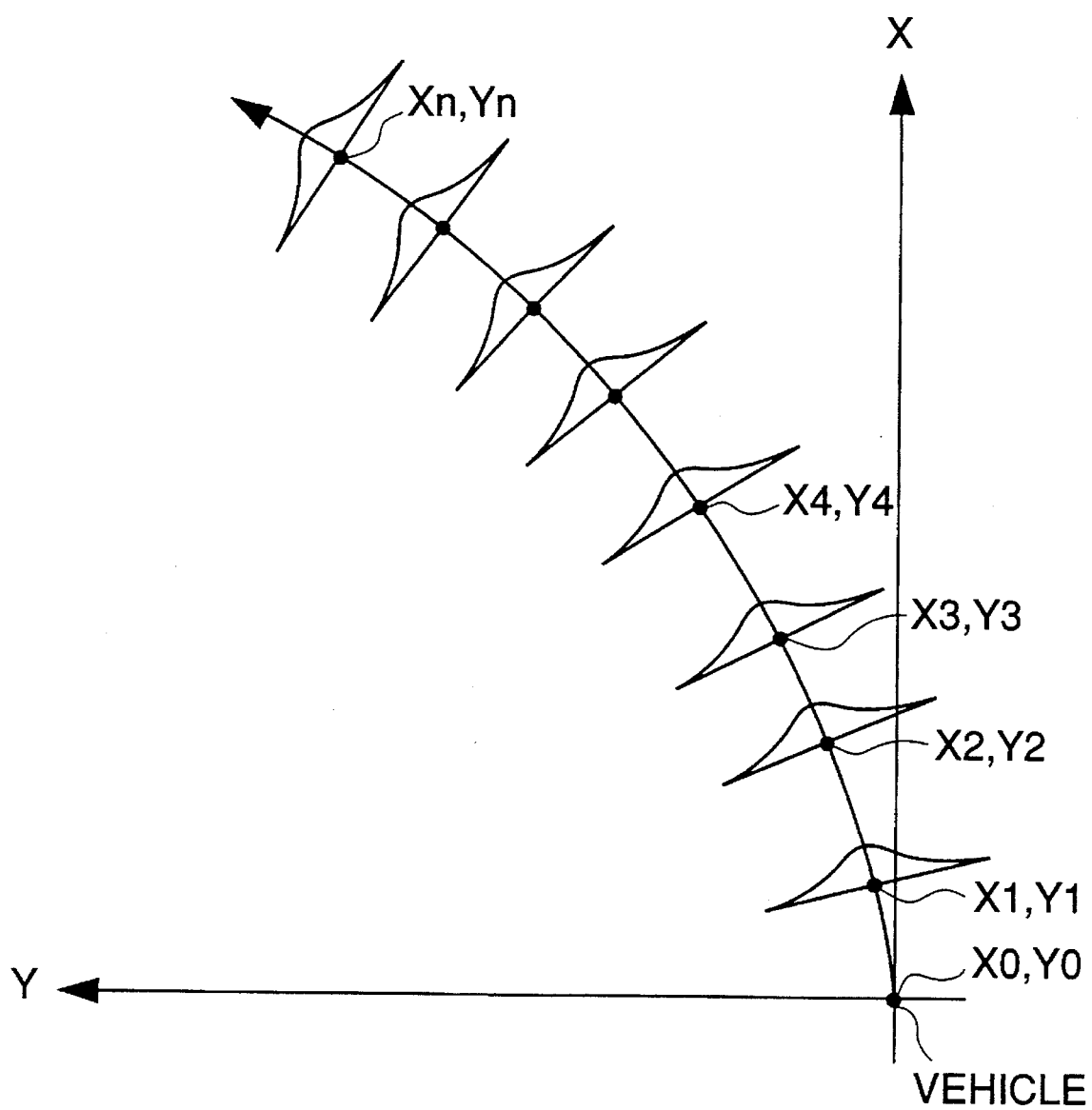
FIG. 15 is a graph useful in explaining a manner of estimating an area of travel of the source vehicle, according to a third embodiment of the invention.

FIG. 15 shows a manner of estimating the area of travel of the source vehicle, according to the third embodiment.

In the first embodiment described hereinbefore, the estimated area of travel of the source vehicle at each time point T(n) (n=1, ... ) is formed by a segment having a predetermined fixed distance (=2$\alpha$) (segment connecting between the points (xn, yn) and (x'n, y'n)). On the other hand, according to the present embodiment, the estimated area of travel of the source vehicle at each time point T(n) is formed by a distribution of probability of existence of the source vehicle in the estimated area of travel thereof.

Figure 16:
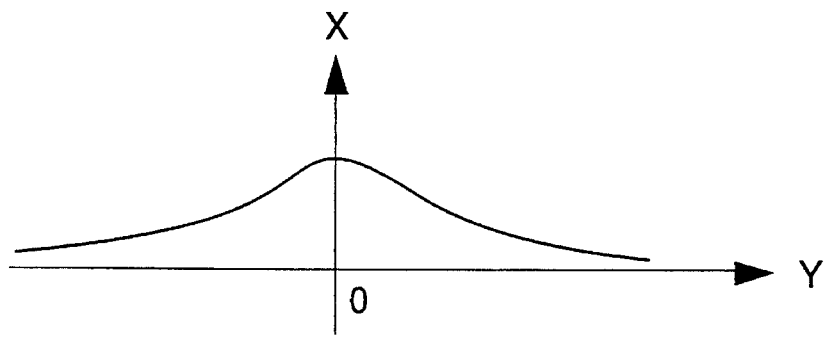
FIG. 16 is a graph showing a distribution of probability of existence of the source vehicle in the area of travel, by way of example.

FIG. 16 shows an example of the distribution of probability of existence of the source vehicle in the estimated area of travel thereof. In this example, a normal distribution determined by a probability density function f(x) represented by the following equation (9) is employed to determine the probability of existence of the source vehicle:

$$f(x) = \frac{1}{\sqrt{2\pi\sigma^2}} \exp\left(-\frac{(x-a)^2}{2\sigma^2}\right) \qquad (9)$$

where f(x) becomes the maximum when $\underline{x}$ is equal to a, and the configuration thereof is determined by the value of $\sigma$.

More specifically, in the estimated area of travel of the source vehicle of FIG. 15, a probability distribution represented by the probability density function f(x) is provided for each portion of the estimated area of travel at each time point T(n), where coordinates are formed with the origin formed by the point (Xn, Yn) at each time point T(n), the X axis by the aforementioned segment, and the Y axis by an axis extending orthogonally to the X axis from the origin, i.e. the advancing direction of the source vehicle from the point (Xn, Yn), respectively. A similar distribution of probability of existence of the object in the estimated area of travel having a similar probability density function may also be provided.

Figure 17:
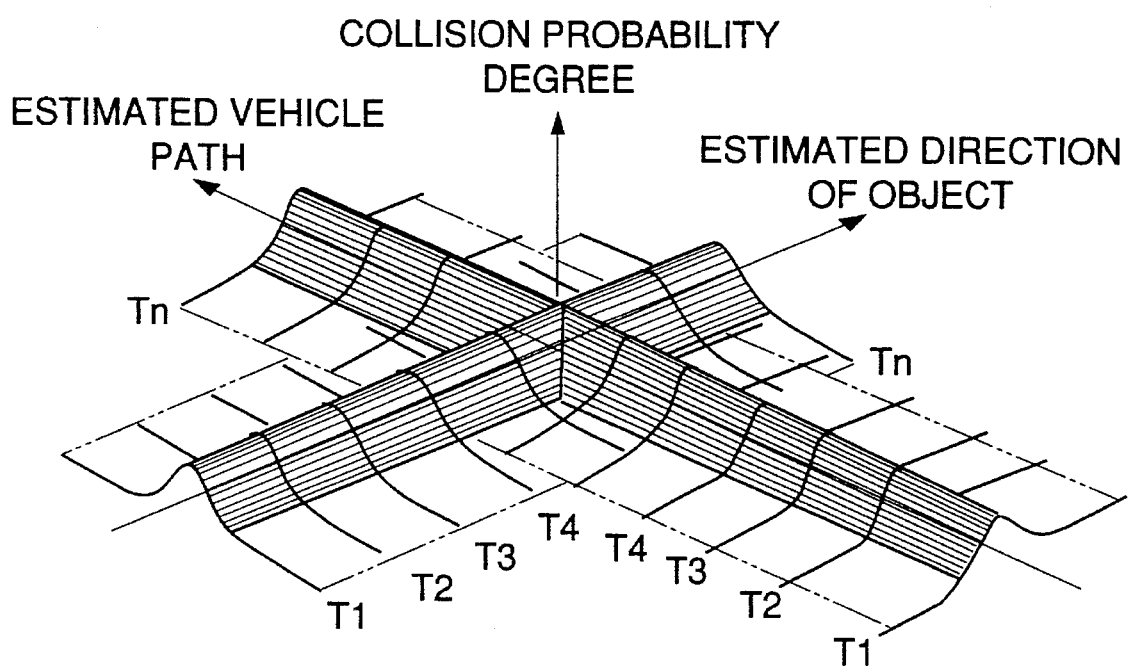
FIG. 17 is a graph useful in explaining a manner of determination of a collision of the source vehicle with an object.
Figure 18:
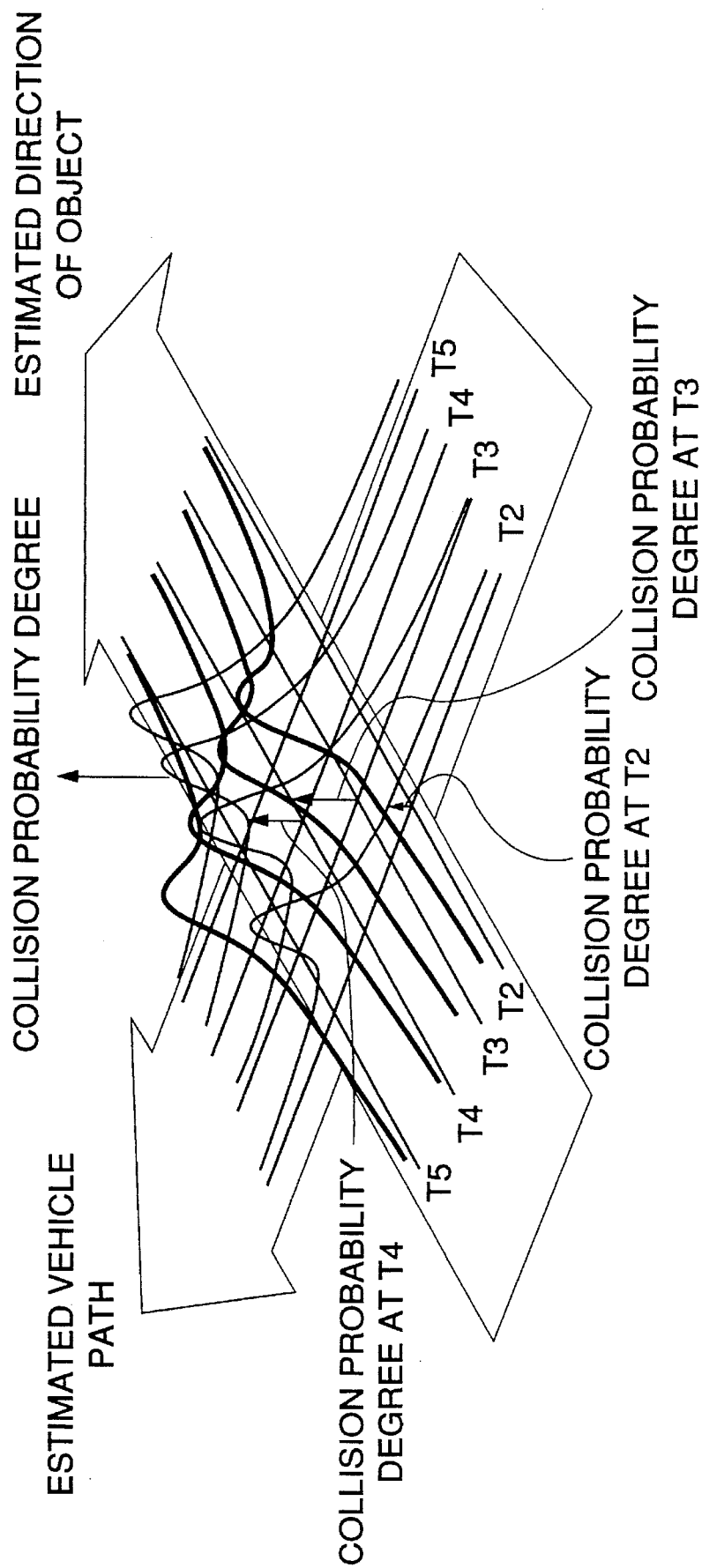
FIG. 18 is a graph more specifically showing the manner of determination of FIG. 17.

FIG. 17 shows an example of application of the method according to the present embodiment to the collision determination between the source vehicle and the object, and FIG. 18 shows the FIG. 17 graph more specifically. In FIGS. 17 and 18, the estimated paths of travel of the source vehicle and the object are plotted on the X-Y plane, and a collision probability degree on the Z axis.

In FIG. 18, collision probability degrees at time points T2 and T3 are indicated by arrows, wherein the length of each of the arrows indicates the magnitude of the collision probability degree. That is, the longer the length of the arrow, the larger the collision probability degree.

FIGS. 19A to 19D show collision probability degrees at time points T2 to T5, respectively. In each figure, the thick solid line indicates the distribution of the source vehicle, the normal solid line the distribution of the object, and the arrow the collision probability degree.

Figure 19A:
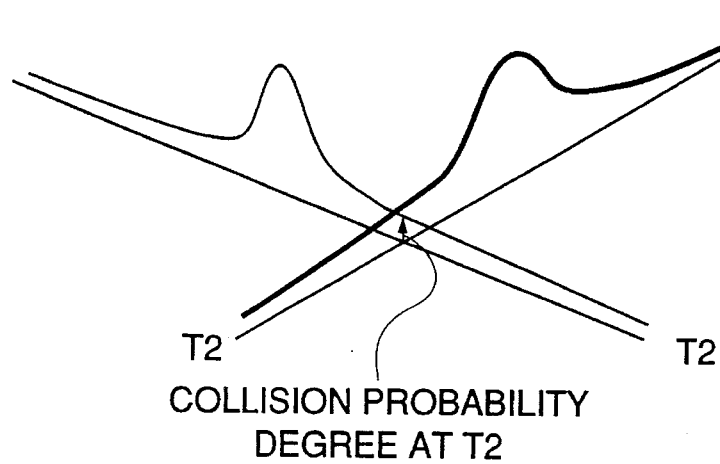
Figure 19B:
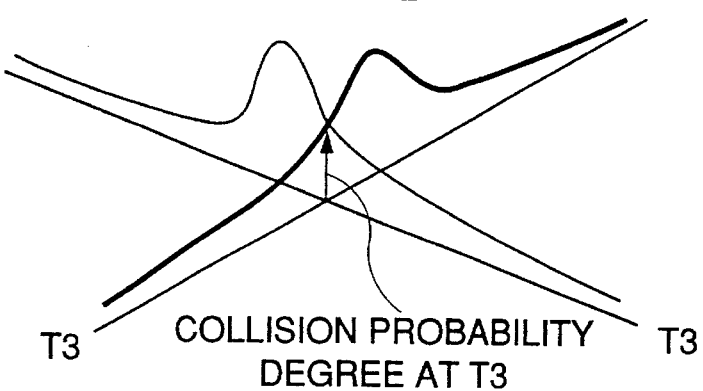
Figure 19C:
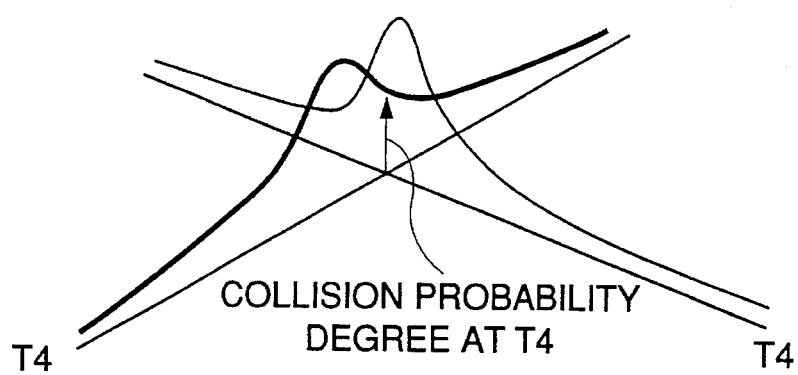
Figure 19D:
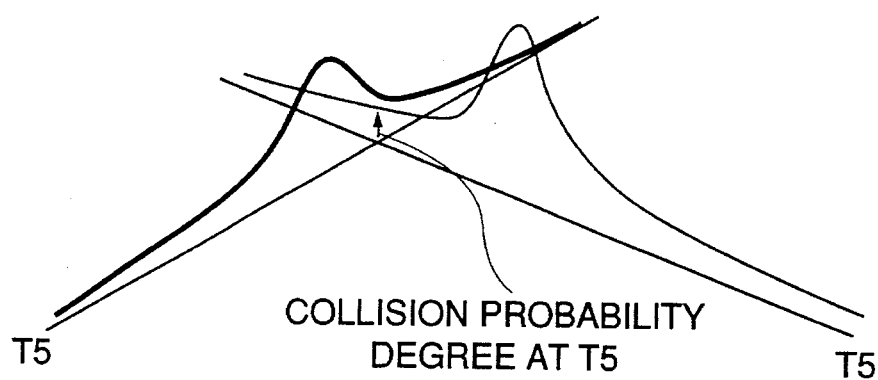

As will be learned from the above, the collision probability degree is defined as a value corresponding to an overlapping amount of the distribution of the source vehicle and the distribution of the object at the same time point. For example, the collision probability degree of FIG. 19C is equal to the length of a segment obtained by intercepting a plane of the distribution of the source vehicle (thick solid line) by a plane of the distribution of the object (normal solid line). On the other hand, the collision probability degree of FIG. 19D is equal to the length of a segment obtained by intercepting a plane of the distribution of the object (normal solid line) by a plane of the distribution of the source vehicle (thick solid line). If the length of the arrow exceeds a predetermined value, it is determined that the source vehicle has a high probability of approaching or colliding with the object.

In the present embodiment, the distribution of probability density function is employed in determining the estimated area of travel at each time point, and therefore the collision prevention control can be achieved with further accuracy.

Figure 20:
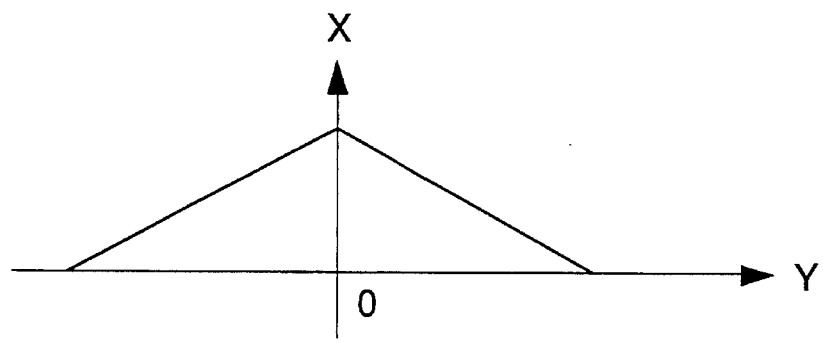
FIG. 20 is a graph showing another example of a distribution of probability of existence of the source vehicle in the area of travel.

The distribution which can be employed by the invention is not limitative to the normal distribution employed in the present invention, but a distribution using a function based on a rule of thumb, such as a membership characteristic function of a fuzzy logic as shown in FIG. 20 may be employed in place of the normal distribution.

Figure 21:
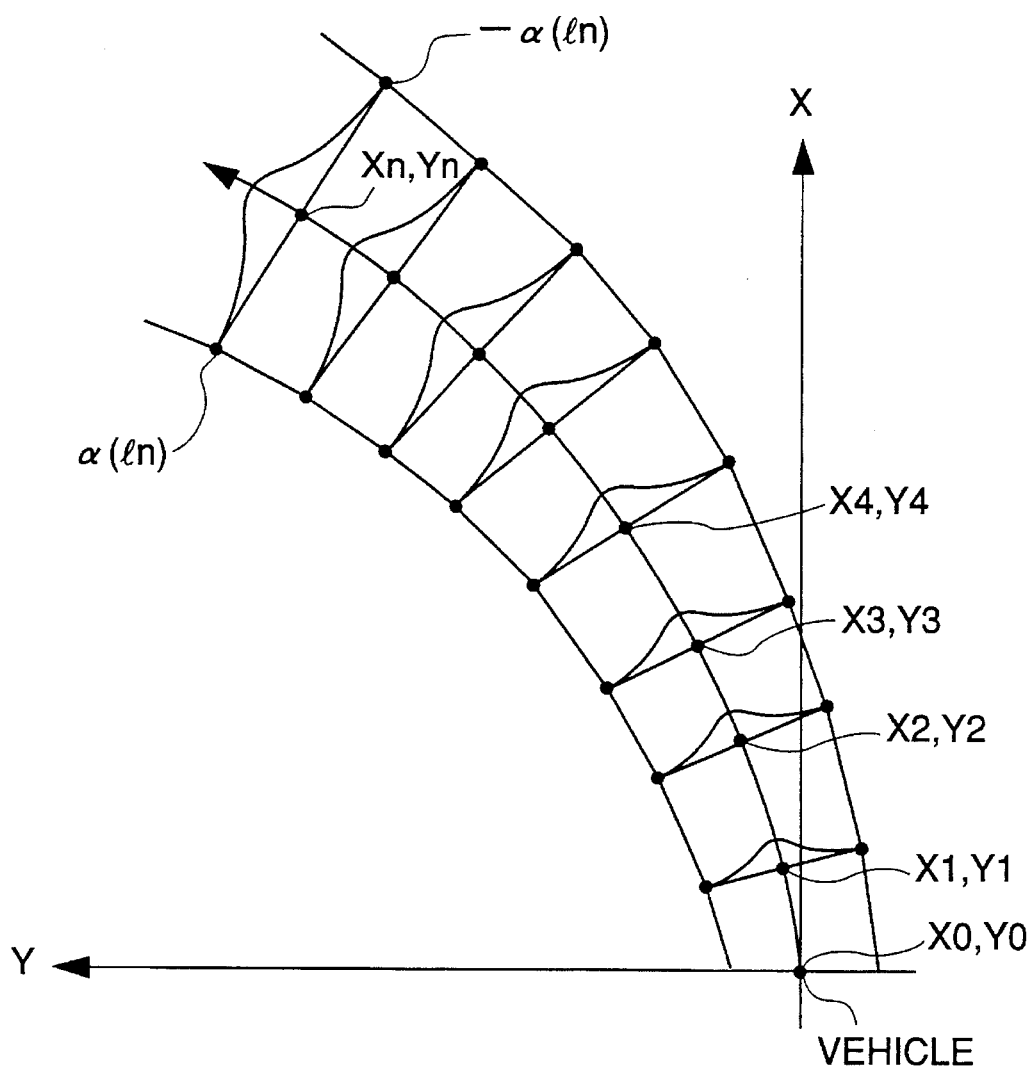
FIG. 21 is a graph useful in explaining a manner of estimating the area of travel of the source travel, according to a fourth embodiment of the invention.

Further, in the present embodiment, the estimated areas of travel of the source vehicle and the object each have a width determined by the predetermined fixed distance $\alpha$ on either side of the path of travel thereof. However, the predetermined fixed distance $\alpha$ may be replaced with the variable distance $\alpha$ (ln) which is a function of the travel distance ln, as shown in FIG. 21, similarly to FIGS. 13 and 14.

Still further, the width (e.g. chassis width) W of the source vehicle or the object may be employed as an additional parameter together with the distance $\alpha$ (ln) in calculating the areas of travel, which enables achieving more accurate determination of collision possibility in response to actual traveling conditions.

As described in detail, according to the invention, to determine the collision point or proximity point between the source vehicle and the object, the areas of travel are estimated in place of the paths of travel. As a result, the collision point or proximity point can be accurately determined, to thereby improve the accuracy of determination of collision possibility.

What is claimed is:

1. In an anti-collision system for preventing a collision of a source vehicle with an object, including object-detecting means for detecting conditions of said object present in the vicinity of said source vehicle, said object including a traveling vehicle preceding said source vehicle, operating condition-detecting means for detecting parameters indicative of operating conditions of said source vehicle, and control means for controlling said source vehicle so as to prevent a collision thereof with said object, based on said conditions of said object detected by said object-detecting means, and said parameters detected by said operating condition-detecting means;

the improvement comprising:

first estimating means for estimating a path of travel of said source vehicle, based on said parameters detected by said operating condition-detecting means;

first setting means for setting an area of travel of said source vehicle to a first predetermined area including said path of travel of said source vehicle estimated by said first estimating means;

second estimating means for estimating a path of movement of said object, based on said conditions of said object detected by said object-detecting means;

second setting means for setting an area of movement of said object to a second predetermined area including said path of movement of said object estimated by said second estimating means; and calculating means for calculating a possibility of collision between said source vehicle and said object, based on said area of travel of said source vehicle set by said first setting means, and said area of movement of said object set by said second setting means; and wherein said control means is responsive to said possibility of collision calculated by said calculating means, for controlling velocity of said source vehicle.

2. An anti-collision system as claimed in claim 1, wherein said first setting means sets said area of travel of said source vehicle having a predetermined width set on either side of said estimated path of travel of said source vehicle transversely of an advancing direction of said estimated path of travel, and said second setting means sets said area of movement of said object having a predetermined width set on either side of said estimated path of movement of said object transversely of an advancing direction of said estimated path of movement.

3. An anti-collision system as claimed in claim 1, wherein said first setting means sets said area of travel of said source vehicle having a variable width determined based on a travel distance over which said source vehicle travels from a starting point of said estimated path of travel thereof and set on either side of said estimated path of travel transversely of an advancing direction of said estimated path of travel, and said second setting means sets said area of movement of said object having a variable width determined based on a movement distance over which said object moves from a starting point of said estimated path of movement thereof and set on either side of said estimated path of movement transversely of an advancing direction of said estimated path of movement.

4. An anti-collision system as claimed in claim 1, wherein said first setting means sets said area of travel of said source vehicle having a variable width determined based on a travel distance over which said source vehicle travels from a starting point of said estimated path of travel thereof and a size of at least one of said source vehicle and said object, said variable width being set on either side of said estimated path transversely of an advancing direction of said estimated path of travel, and said second setting means sets said area of movement of said object having a variable width determined based on a movement distance over which said object moves from a starting point of said estimated path of movement thereof and said size of at least one of said source vehicle and said object, said variable width being set on either side of said estimated path of movement transversely of an advancing direction of said estimated path of movement.

5. An anti-collision system as claimed in claim 1, wherein said operating condition-detecting means detects a yaw rate of said source vehicle as one of said parameters indicative of said operating conditions of said source vehicle.

6. An anti-collision system as claimed in claim 1, wherein said calculating means detects relative velocity between said source vehicle and said object and a relative distance therebetween, in dependence on said possibility of collision calculated, and calculates a desired deceleration value of said source vehicle and a desired value of velocity of said source vehicle to which said source vehicle is to decelerate, based on the detected relative velocity and relative distance, said control means controlling said velocity of said source vehicle, based on the calculated desired deceleration value and desired value of velocity.

7. An anti-collision system as claimed in claim 5, including warning means for issuing a warning to a driver of said source vehicle when said control means controls said velocity of said source vehicle.

8. An anti-collision system as claimed in claim 2 or 3, wherein said first setting means sets said area of travel of said source vehicle by the use of a probability density function indicative of a probability of existence of said source vehicle in said area of travel of said source vehicle.

9. An anti-collision system as claimed in claim 2 or 3, wherein said first setting means sets said area of travel of said source vehicle by the use of a probability density function indicative of a probability of existence of said source vehicle in said area of travel of said source vehicle, and said second setting means sets said area of movement of said object by the use of a second probability density function indicative of a probability of existence of said object in said area of movement of said object.

* * * * *